United States Patent
Ostertag et al.

(10) Patent No.: US 8,200,770 B2
(45) Date of Patent: Jun. 12, 2012

(54) INFORMATION EXCHANGE TOOL

(75) Inventors: Manfred Ostertag, Half Moon Bay, CA (US); William M. Sambrooke, San Francisco, CA (US)

(73) Assignee: SAP Aktiengesellschaft, Walldorf (DE)

( * ) Notice: Subject to any disclaimer, the term of this patent is extended or adjusted under 35 U.S.C. 154(b) by 149 days.

(21) Appl. No.: 12/127,906

(22) Filed: May 28, 2008

(65) Prior Publication Data

US 2008/0228857 A1 Sep. 18, 2008

Related U.S. Application Data

(62) Division of application No. 10/620,539, filed on Jul. 16, 2003, now Pat. No. 7,395,316.

(51) Int. Cl.
*G06Q 10/00* (2012.01)
*G06F 15/16* (2006.01)

(52) U.S. Cl. ..... 709/207; 705/7.13; 705/7.14; 705/7.17; 705/7.25; 705/321

(58) Field of Classification Search .................. None
See application file for complete search history.

(56) References Cited

U.S. PATENT DOCUMENTS

| | | | |
|---|---|---|---|
| 6,366,913 B1 * | 4/2002 | Fitler et al. | 707/9 |
| 6,480,885 B1 | 11/2002 | Olivier | |
| 6,963,850 B1 | 11/2005 | Bezos et al. | |
| 7,069,259 B2 | 6/2006 | Horvitz et al. | |
| 7,496,518 B1 * | 2/2009 | Cayton et al. | 705/1 |
| 2002/0035533 A1 | 3/2002 | Mache et al. | |
| 2002/0057284 A1 | 5/2002 | Dalby et al. | |
| 2002/0087496 A1 | 7/2002 | Stirpe et al. | |
| 2002/0156904 A1 | 10/2002 | Gullotta et al. | |
| 2003/0004774 A1 | 1/2003 | Greene et al. | |
| 2003/0005098 A1 | 1/2003 | Koelle et al. | |
| 2003/0083891 A1 * | 5/2003 | Lang et al. | 705/1 |
| 2003/0088463 A1 | 5/2003 | Kanevsky et al. | |
| 2003/0171942 A1 | 9/2003 | Gaito | |
| 2004/0204957 A1 | 10/2004 | Afeyan et al. | |
| 2005/0032518 A1 | 2/2005 | Rajan | |

* cited by examiner

*Primary Examiner* — Wen-Tai Lin
(74) *Attorney, Agent, or Firm* — Fish & Richardson P.C.

(57) ABSTRACT

Mining human capital information includes defining one or more attributes of a communication group, extracting a target group by searching one or more of explicit and implicit data sources according to the defined attributes, communicating with the extracted target group, logging at least some of the communications, and analyzing the logged communications.

1 Claim, 4 Drawing Sheets

300 ⟶

302 — Define Attributes of a First Group of Objects

304 — Use the Defined Attributes to Search Data Sources for the First Group of Objects 306 — Use Results of the Search to Perform a Relationship Evaluation to Derive a Secondary Group of Objects

INFORMATION EXCHANGE TOOL

RELATED APPLICATIONS

This application is a divisional (and claims the benefit of priority under 35 U.S.C. §121) of U.S. application Ser. No. 10/620,539, filed Jul. 16, 2003, now U.S. Pat. No. 7,395,316. The disclosure of the prior application is considered part of (and is incorporated by reference in) the disclosure of this application.

BACKGROUND

The following disclosure relates to an information exchange tool.

Enterprises typically have a need to communicate and extract information from individuals across their organization. Enterprises often employ techniques for one-to-one/one-to-few communications such as, for example, electronic-mail (email). They also may employ techniques available for large-scale communications using, for example, enterprise-wide custom surveys.

SUMMARY

The present inventors recognized that exchange techniques, such as email and surveys may lack the ability to communicate with a group of individuals in an enterprise in an efficient and structured manner. Accordingly, systems and techniques described here, among other features, enable an enterprise to communicate with a target group having a common attribute.

Human Capital Information Mining

Human capital information mining (HCIM) may involve searching explicitly defined data and implicit data, such as information extracted from emails, to define certain attributes of a target group. Communications can take place with a list of people who fit specified search attribute criteria. Communication may involve either pushing information to a list of people or sending a request for information to those people. The communications can be saved, extracted, assimilated and analyzed by the enterprise.

The systems and techniques may find application in several different contexts such as Human Capital Information Mining, Distribution list Management, and Relationship Identification and Communication.

In one aspect, the systems and techniques described here include defining one or more attributes of a communication group, extracting a target group by searching one or more of explicit and implicit data sources according to the defined attributes, communicating with the extracted target group, logging at least some of the communications, and analyzing the logged communications.

The defined attributes may be saved for future use. Moreover, communicating with the extracted target group may include sending to the target group an information request based on at least one of a survey and a questionnaire. A report can be generated based on a result of analyzing the logged communications. An enterprise resource planning (ERP) system can be accessed to extract a target group. Information can be sent to a member of the target group triggered on an occurrence of a life or work event associated with a member. Attributes can be based on at least one of special knowledge area, work experience, academic experience, position, and work situation associated with the target group.

Communicating can occur over at least one of a computer network, wired or wireless communications channels, the Internet, an intranet, extranet, email and voice-mail. Communication with the target group can include at least one of structured communication wherein possible responses to queries are predefined and/or unstructured communication wherein possible responses to queries are not predefined. Communicating can include distributing information to the target group, and receiving feedback from the target group. Enterprise software systems can be provided with an ability to make decisions automatically based on a result of analyzing the one or more logged communications. Explicit data sources can include explicitly defined attribute information, and implicit data sources can include implicitly defined attribute information.

In various implementations, the disclosed techniques may provide one or more of the following advantages. Enterprises typically have a need to communicate with individuals across their organization. Enterprises often employ techniques for one-to-one/one-to-few communications such as, for example, email. These communications require that the target group be pre-defined by naming the recipient(s) or by pre-defining a static distribution list. They may also employ techniques available for large-scale communications using, for example, enterprise-wide custom surveys. The use of the above techniques provides an enterprise the ability to communicate with a flexible target group based on one or more common attributes for the target group, e.g., all employees with Java programming experience that work in the Palo Alto office and with more than 3 years experience. These techniques can be combined with tools such as SAP's Business Intelligence product for extracting, assimilating and analyzing data, providing a facility for logging communication data and then analyzing the logged communications.

Distribution List Management

In general, distribution list management (DLM) provides an enterprise with an ability to create and maintain a dynamic distribution list. By defining a target group based on one or more attributes rather than explicitly defining the members, the group's membership may vary depending on when the search for members having the attributes is run.

Establishing a target group may include defining information associated with one or more attributes for a target group, saving the defined attribute information, and searching explicit and implicit data sources for people having the defined attributes.

Generating or updating a distribution list defining a target group may be performed at the time information is to be exchanged with the target group. Information communicated to the extracted target group may include an information request based on at least one of a survey and a questionnaire. An enterprise resource planning system may be accessed to define information associated with one or more attributes for a target group. Information may be send to a member of the target group triggered on an occurrence of a life or work event associated with a member.

The defined attributes delineating the target group may be based on a special knowledge area, work experience, academic experience, position, and/or work situation associated with the target group. Communicating with the target group may occur over one or more of a computer network, wired or wireless channel, the Internet, an intranet, an extranet, email and/or voice-mail. Communicating with the target group may include sending the target group structured communication wherein possible responses to queries are predefined, and/or unstructured communication wherein possible responses to queries are not predefined. Communicating with the target group may further include distributing information to the target group, and receiving feedback from the target group.

Identifying one or more attributes may include searching data sources having explicitly defined attribute information and searching data sources having implicitly defined attribute information.

In various implementations, the disclosed DLM techniques may provide one or more of the following advantages. Enterprises often have a need to be able to communicate to specific groups of people. Currently, e-mail systems provide for defining distribution lists. Typically, these are created well before communicating with the target group via extraction of data out of an ERP system or built up manually. These static distributions lists tend to be valid only at the point of creation and may gradually become outdated as employees change positions or other attributes.

Enterprises also typically need to identify individuals in an enterprise with certain attributes or qualifications for purposes of targeted communications or to define a project group. Search engines exist for searching fixed databases, for example, SAP's Enterprise Resource Planning (ERP) system searches explicit data. Search engines also may search implicit data, for example, web crawlers or SAP's Expert Finder may search email or other unstructured information.

One need, however, that may not have previously been considered or addressed is the ability to identify a target group of people having a user-defined set of attributes, and the ability to extract a currently accurate target group at any time, taking into account employee changes. For example, the attributes may define all employees with Java programming experience that work in the Palo Alto office and with more than 3 years experience. The described techniques may realize these and other advantages by providing an enterprise with the ability to search across a plurality of data sources and save the search criteria for future identification of a target group having the same minimum attributes.

Relationship Identifier and Communications

Relationship identifier and communications techniques provide an enterprise with an ability to perform a search and to extract a target group and then using the extracted target group to run a secondary relationship evaluation process to derive a secondary group from the target group.

In this context, identifying a target group may include declaring attributes required for membership to a first group of objects (e.g., computer servers at a certain location in an enterprise), using a least some of the defined attributes to search at least one of explicit and implicit data sources for objects belonging to the first group, and using results of the search to perform a relationship evaluation to derive a secondary group of objects (e.g., Managers owning cost centers to which computer servers with attributes of the first group belong).

Moreover, the results of a previous relationship evaluation may be used to perform a subsequent relationship evaluation to derive a subsequent group of objects. The first group of objects may include a first group of people and the secondary group of objects may include a secondary group of people having an organizational relationship with the first group of people. An enterprise resource planning system may be accessed to obtain information associated with one or more attributes for a first group of objects. Attributes may be based on special knowledge area, work experience, academic experience, position, and/or work situation associated with the first group of objects. (E.g., A previous relationship evaluation identified Managers owning cost centers to which computer servers with certain attributes belong. A subsequent relationship evaluation identifies the Administrative Assistants of those Managers with a specific technical expertise, with the purpose of organizing a Technical Update meeting.)

The disclosed techniques may be applicable in the context of human resources management where the groups and relationships relate to people such as managers or administrative personnel associated with each of the target group (employees). In this context, secondary and possibly further levels of relationship evaluations may be performed, using the results (group) of the previous search or relationship evaluation. These techniques may be applicable to other objects and their relationships.

The disclosed techniques may provide one or more of the following advantages. An enterprise may have a need to search and then communicate with a group of people having a common attribute. However, such information may not always be directly accessible in a search. For instance, search engines may search using fixed database fields including explicit data and implicit data. However the result of the primary search may not necessarily include the desired group of people. For instance, it may be desirable to locate the managers of personnel. While a search can be executed defining employee attributes, it may not necessarily define the manager of the employee.

These techniques also may provide the ability to extract information that may not directly available from a single search step. For example, manager information may be determined by evaluating the relationship "employee-manager," allowing the group of managers to be derived using the group of employees. Accordingly, the disclosed techniques and systems provide a dramatic advantage in that they facilitate defining relationship criteria and have a series of successive relationship evaluation runs that leverage information extracted from earlier searches or relationship evaluations in the series.

The disclosed techniques are not limited to searching for people or relationships to people. They may apply to any group of objects, applying a specific relationship to the group of objects and deriving a secondary group of objects. For instance, searching within the inventory of a company for the objects "printer in building A" may result in a list of all printers within the company and building A. Evaluating the relationship "printer<->cost center", the group of derived objects may include a list of all cost centers containing a printer in building A. Evaluating the relationship "cost center<->cost center manager", the group of derived objects may include a list of all cost center managers "owning a printer in building A." Evaluating the relationship "manager<->admin assistant", the group of derived objects may include a list of all assistants assigned to a manager responsible for printers in building A. Having identified these assistants, a manager may be able to send an email message to the assistants about "phasing out the individual printers" and implementing central print services in another location.

The techniques disclosed herein may serve as an enterprise survey tool for facilitating the management and extraction of information from human capital assets such as employees in an enterprise. The techniques may permit precise targeting of a desired "knowledge group" within the enterprise in combination with existing enterprise resource planning (ERP) data and Expertise Management software. Information may be accurately distributed to a specific "knowledge group" through communication channels (email, voice mail, etc.), keeping the people in an organization who "need to know" well-informed. Also, Structured information may be efficiently and consistently extracted from repositories relating to a "knowledge group" by combining survey tools techniques and deploying existing ERP data. Support may be provided for persistent and consistent analytics and reporting on distributed/extracted information by supporting and deploying enterprise business warehouse (BW) systems.

Moreover, an enterprise may be able to mine high quality information from its human capital assets in an efficient, persistent and consistent manner. For example, the enterprise may provide high quality information through precise targeting of "knowledge groups" (representing the paradigm "ask the people who know"). This can be achieved efficiently by, for example, precise targeting of knowledge groups ("ask only the people who know, inform only the people who need to know"), by complementing survey content with business content already available through ERP ("use the data you already have"), and by improved survey response management. The information may be persistent because information is stored and collected in the enterprise BW ("keep the data you need"). The information also may be consistent because a common enterprise analytics and reporting tool is deployed ("the right data available to the right people") and because a single enterprise communication solution is deployed throughout the enterprise ("one need, one solution").

The techniques may allow enterprise applications to provide a new class of communication to be directed to knowledge groups not previously accessible to decision makers: Questions, which previously were not appropriate when asked across an entire enterprise, can now be directed to an expert audience; Information, which may not have made sense to be distributed across an entire enterprise (or even to a static distribution list), can now be directed to a targeted audience; Accessible, high quality information/data may now enable decision maker within the enterprise to make informed business decisions.

The techniques can be used by an enterprise to replace current systems, such as "two-way, one-to-many, structured communication tools" like spreadsheets, broadcast emails and custom survey solutions, which tend to be inefficient, ineffective and costly. Consequently, the techniques disclosed herein may allow an enterprise, for example, to make better decisions, visualize new opportunities, reduce existing costs, and increase efficiency and effectiveness of processes.

The details of one or more embodiments are set forth in the accompanying drawings and the description below. Other features and advantages will be apparent from the description and drawings, and from the claims.

DRAWING DESCRIPTIONS

Like reference symbols in the various drawings indicate like elements.

DETAILED DESCRIPTION

Figure 1:
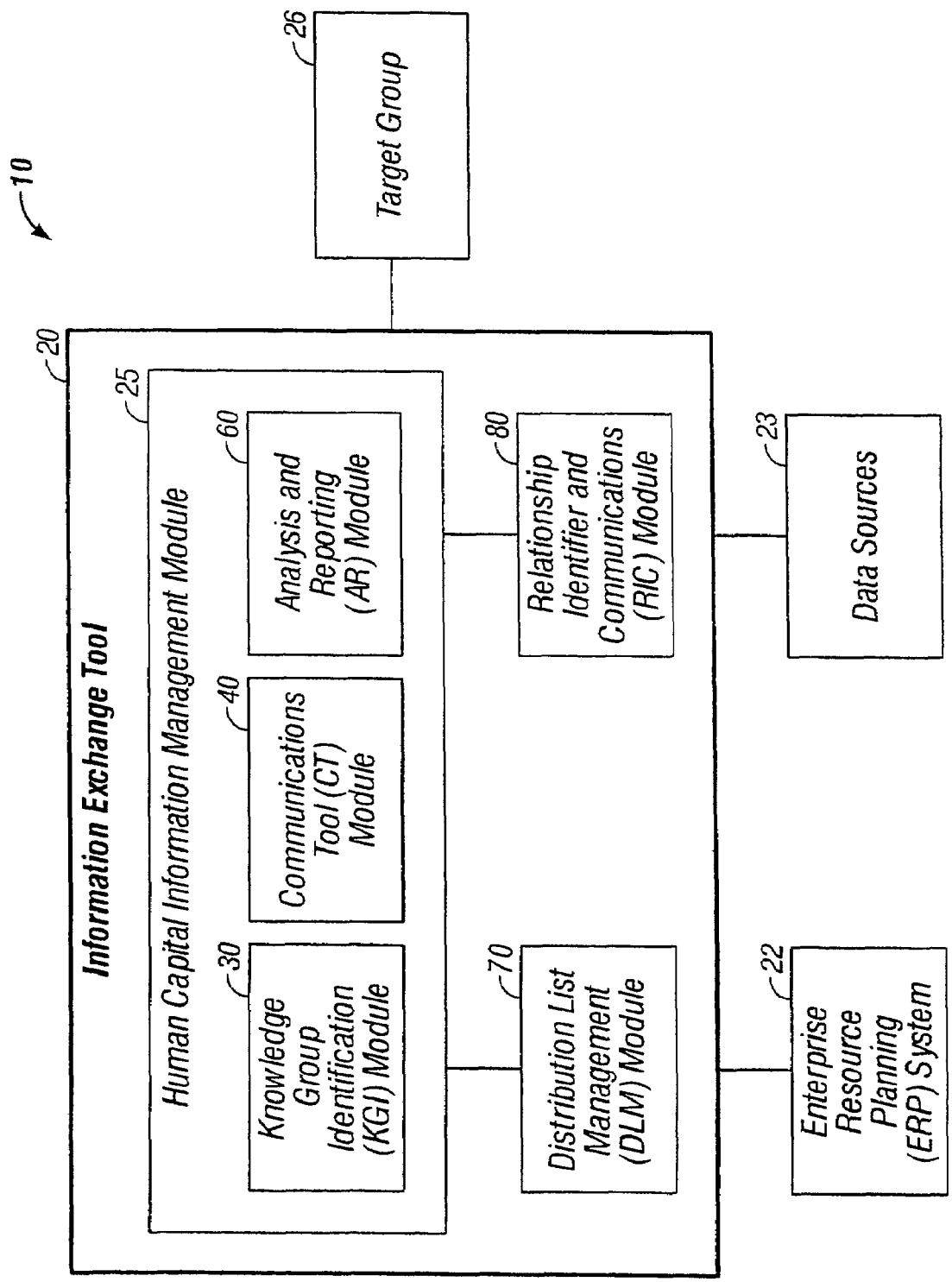
FIG. 1 is a block diagram of an implementation of a information exchange tool.

FIG. 1 is a block diagram of a computer system 10 for implementing an information exchange tool 20. The tool 20 includes a human capital information mining (HCIM) module 25, a distribution list management (DLM) module 70 and a relationship identifier and communications (RIC) module 80.

The HCIM module 25 further includes a knowledge group identification module (KGI) 30, a communications tool (CT) module 40 and an analysis and reporting (AR) module 60. In one implementation, the KGI module 30 can search explicitly defined data (e.g. SAP's ERP (Enterprise Resource Planning) product) and implicit data such as information extracted from emails. For example, the module can search for information related to the members of the enterprise by using an enterprise resource planning (ERP) system 22 and data sources 23 containing explicit and implicit data related to employees of an enterprise. In one implementation, the ERP system 22 can include human resources (HR) master data of employees of the enterprise (e.g. job position, cost center, seniority) and event information such as Work and Life events affecting employees of an enterprise.

Life and work events may be defined as inflection points in the path of an employee's career or personal life, which may cause a change in an employee's status from the employer's perspective. These changes often require communication between employer and employee, to convey details and/or action items regarding the new status. Such changes may include Promotion, Birth of a child, Marriage, Salary increase, Expiration of professional certification, Divorce, Change of Position, or other changes. A Life and Work event may trigger workflows, such as the Life and Work event for "Marriage" may trigger a workflow for "Benefits enrollment" and "Change of dependent information via employee self service."

The KGI module 30 may allow the user to define certain attributes of a target (knowledge) group 26 the user wishes to communicate with, and have a list of people extracted that fits the search attribute criteria. The KGI module 30 identifies a target group 26 having a common attribute such as expertise in a technical area and creates a list of members belonging to the group. The KGI module 30 can search explicit and implicit data sources. Explicit data sources can include explicitly defined data such as data from SAP's ERP system. Implicit data sources can include implicitly defined data such as information extracted from emails.

The CT module 40 provides communication techniques for exchanging information with a group such as by providing applications for sending a request to the group using a template based on a survey-sheet, a questionnaire or other template. For example, information (e.g., an announcement) may be pushed to a list of people or take the form of a request for information (e.g., pull information) such as a survey. The information may be exchanged over one or more communication channels such a computer network, the Internet, an intranet, an extranet, email, voice-mail or other communications channel. In one implementation, the CT module 40 can log communications such as the exchange of information with the target group.

In one implementation, the AR module 60 may allow the saved communications to be extracted, assimilated and analyzed (e.g., SAP's Business Intelligence product). The AR module 60 provides information storage, access and analysis functionality for receiving and analyzing a response to the information from the group.

The DLM module 70 may permit an enterprise to create and save a dynamic list of members in the enterprise based on a common attribute shared among the members. By defining a target group based on one or more attributes rather than explicitly defining the members, the group may vary depending on when the search is run. The DLM module 70 retrieves member data from the ERP system 22 and/or data sources 23 and uses the KGI module 30 to create a dynamic list of members having a common attribute. The list can be updated based on a change to a characteristic of the members in the enterprise such as a change in the number of individuals in the list. The DLM module 70 uses the services of the CT module 40 to exchange information with the members of the list over a communications channel. The DLM module 70 also employs the services of the AR module 60 to analyze and report the results of responses from the members of the group.

The RIC module 80 may allow an enterprise to identify members having a relationship with other members in an enterprise. The module performs a search to extract a target group and then using the extracted target group to run a secondary relationship evaluation process to derive a secondary group from the target group. The disclosed techniques may be applicable in the context of human resources management where the groups and relationships relate to people, e.g., managers or administrative personnel associated with each of the target group members of employees. Secondary and possibly further levels of relationship evaluations may be performed using the results (group) of the previous search or relationship evaluation. The functionality of the module also can relate to other objects and their relationships. The RIC module 80 employs the functionality of KGI module 30 to identify groups as well as the services of the CT module 40 to send members in the second group a request for information related to the members of the first group. For example, the request can include a set of questions related to the members such as their depth of experience in a technical area. Like the DLM module 70, the RIC module 80 employs the services of the AR module 60 to analyze and report responses from the members of the group.

Human Capital Information Mining

Figure 2:
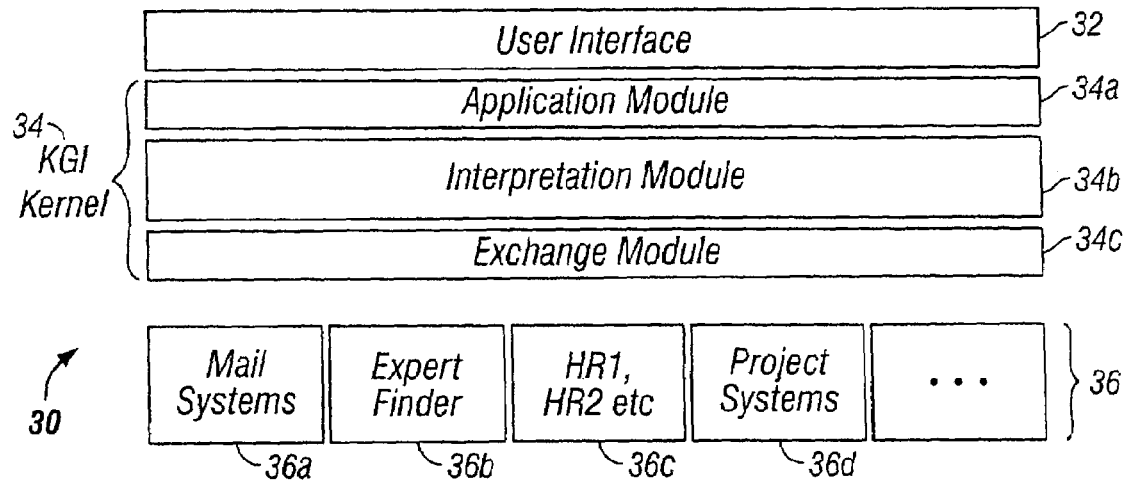
FIG. 2 is a block diagram of a knowledge group identification (KGI) module associated with an information exchange tool.

FIG. 2 is a block diagram of an implementation of a KGI module 30 associated with the HCIM module 25 of FIG. 1. The KGI module 30 may allow a user to enter parameters such as data related to common attributes. The KGI module 30 can use the common attributes to identify a group having those attributes. The KGI module 30 comprises a combination of hardware and software modules including a user-interface 32, a KGI Kernel 34 and data sources 36. The user-interface 32 may allow a user to display data from the tool 20 and to provide data to the tool. For example, the user can enter a request (including common attributes) to be used for identifying a group sharing those attributes. In response, the tool 20 can return a list of members and display the list of members in the group to the user through the user-interface 32. Common attributes can include user definable parameters for identifying a group such as, for example, special knowledge areas, work experience, academic expertise, position in the enterprise, work situation or other common attributes.

The KGI Kernel 34 includes an application module 34a, an interpretation module 34b and an exchange module 34c. The application module 34a includes functionality for receiving user requests and forwarding the requests to the interpretation module 34b. The application module 34a also receives/handles requests from calling applications as well as packages knowledge group contents for the calling applications. Calling applications can include, for example, the DLM module 70 and the RIC module 80.

The interpretation module 34b is responsible for receiving and processing requests from the application module 34a. For example, the interpretation module 34b can receive data containers holding the results of the request from the exchange module 34c and evaluates the contents of the containers. Data containers provide a data structure for exchanging data between modules. The interpretation module 34b determines potential data sources 36 for satisfying the requests and returns a knowledge group (i.e. a list of people satisfying the user request) to the application module 34a.

The exchange module 34c provides an interface layer between the interpretation module 34b and the data sources 36. For instance, the exchange module 34c can receive data requests from the interpretation module 34b and perform communication functions (requests for data) with the data sources 36 as well as handle protocols, data formats or other communications functions. The exchange module 34c also can return data containers to the interpretation module 34b in a generic format.

The information exchange tool 20 also can employ the data sources 36 for searching for information related to the members of the enterprise. For example, the tool 20 can use the data sources 36 to gather common attribute information related to members of the enterprise as well store the information for subsequent access to identify a knowledge group. Data sources 36 can include data providers such as, for example, mail systems 36a, expert finder 36b, one or more human resource (HR) systems 36c, project systems 36d or other data providers. The mail systems 36a can include data derived from email, voice-mail, traditional mail or other mail related sources. The expert finder 36b, such as Expert Finder provided by SAP, can be used to create a knowledge group or dynamic distribution list of members of the group. The expert finder 36b includes a static distribution list that is updated periodically and provides implicit member information based on prior communications, such as emails, exchanged with the members of the enterprise.

Implicit member information may be defined as information that infers, but does not directly state, interest, expertise or responsibility of an individual regarding a certain subject. For example: Over 50 emails mentioning "Section ABC Compliance" are written by a software engineer in a short time frame. Implicit membership of this employee to the group of company engineers with a professional interest in legislation affecting "Section ABC Compliance" can be inferred from this information. On the other hand, explicit member information may be defined as information that states by definition an interest, expertise or responsibility of an individual regarding a certain subject. For example: Under 'Areas of Expertise' in a company's skills database, the value "Section ABC Compliance" is stored for an individual software engineer. Or, the position "Java Developer" has a mandatory requirement of Java expertise, and therefore any individual stated to be in this position is automatically stated to have this expertise.

The HR systems 36c can provide detailed information related to the employees of the enterprise. For example, the HR systems 36c can contain work relationship data (e.g. cost center, product line), personnel number data (e.g. change tracking, data entry), relationship information (e.g. employee's supervisor or manager) or other information. Information related to projects with which individuals of the enterprise have been involved can be stored in project systems 36d.

As mentioned above, the information exchange tool 20 also can extract employee information from an existing ERP system 22 of the enterprise. The ERP system 22 provides static employee information that is updated periodically and provides explicit member data. The ERP system 22 also may include a search engine for searching a database for member data. The database can be used to store and retrieve member data using a unique static member identifier such as an employee number or a social-security-number.

Figure 3:
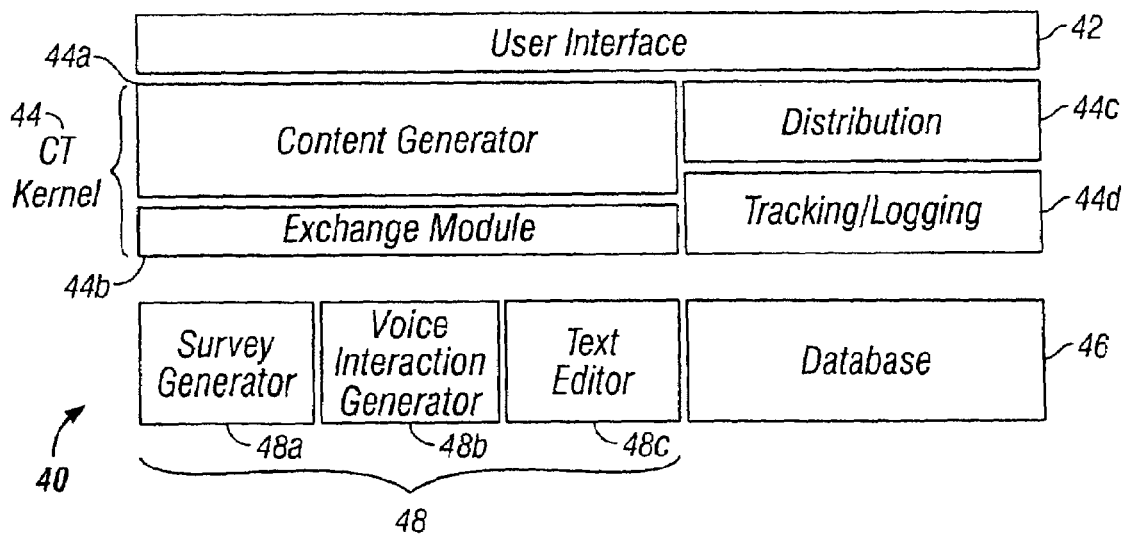
FIG. 3 is a block diagram of a communications tool (CT) module associated with an information exchange tool.

FIG. 3 is a block diagram of an implementation of a CT module 40 associated with the HCIM module 25 shown in FIG. 1. Once the KGI module 30 has identified a group having common attributes, the CT module 40 can initiate specific and or structured communication with the members of the group and monitor responses from the members. The CT module 40 includes a user-interface 42, a CT Kernel 44, a database 46 and content providers 48. Like user-interface 32 of KGI module 30, the user-interface 42 of CT module 40 allows the user to interact with the functionality of the CT module.

Structured communication may be defined as communications wherein possible responses to queries are predefined. For example, a multiple choice question, or a type restricted response (e.g. Query: "Indicate the number of people available on this date?", Response: "6".) Answers can be immediately quantified. Lack of response can also be quantified. Unstructured communication is defined as communications where possible responses to queries are undefined. The query can includes a question inviting a free form response. (e.g. Query: "Do you have any concerns about the project?", Response (free form): maybe a "Yes", a "No", a list of concerns, or a response addressing a tangential subject.) Text based email is most commonly unstructured communication. Responses to unstructured queries may be highly subject to interpretation, and are difficult to quantify when received in large number. Lack of response is also difficult to quantify (the recipient may respond without actually addressing the question).

The CT Kernel 44 includes a content generator module 44a, an exchange module 44b, a distribution module 44c and a tracking/logging module 44d. The content generator module 44a is responsible for the creation of communication content that is ultimately distributed to the members of a group identified by KGI module 30. The content generator module 44a handles this function by receiving requests for content from the distribution module 44c, sending the requests to the content providers 48 through the exchange module 44b, and returning links to appropriate types of content generated by the content providers 48.

The exchange module 44b acts as an interface to the content providers 48. The exchange module 44b also can launch application programs associated with the content providers 48, handle different aspects of the content providers such as communication protocols, and format and bundle content in a common format and return links to the content.

The distribution module 44c is responsible for distributing communications content (e.g. survey embedded in an email) to members of the group identified by KGI module 30. The distribution module 44c also handles requests/accepts knowledge group lists from KGI module 30 as well as requests from the content generator 44a for content supplied by the content providers 48. The tracking/logging module 44d performs functions for managing communications with members of a knowledge group. For example, the module 44d can log communications sent by the distribution module 44c (i.e. who sent what), track (i.e. monitor who responded to the communications) and store responses in the database 46 or other functions. The database 46 can be used to track and store the responses from the members in a group that have received communications from the distribution module 44c.

Content providers 48 can include applications for supplying communication content such as surveys from a survey generator 48a, voice-mail messages from a voice interaction generator 48b, text messages from a text editor 48c, hardcopy letters, hypertext markup language (HTML) pages, or other content generation techniques. The survey generator 48a is capable of creating surveys such as satisfaction surveys, opinion surveys, performance feedback surveys or other surveys.

Figure 4:
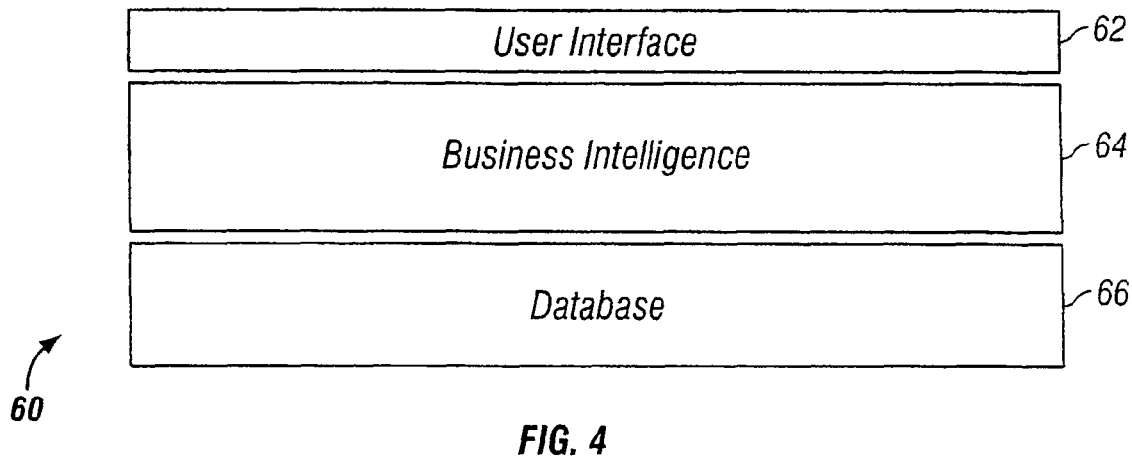
FIG. 4 is a block diagram of an analysis and reporting (AR) module associated with an information exchange tool.

FIG. 4 is a block diagram of an implementation of an AR module 60 associated with the HCIM module 25 shown in FIG. 1. The AR module 60 can provide functionality such as information storage, information access, information analysis and reporting functionality. The AR module 60 includes a user-interface 62, a business intelligence module 64 and a database 66. The user-interface 62 is similar to the user-interface 32 of KGI module 30 in that it can allow a user to display data and enter data for use with the AR module 60. In one implementation, the AR module 60 can employ an authorization/roles concept to make information provided by the CT module 40 easily accessible to specific users of the enterprise. In addition, transparent storage and access can be achieved through Portals integration.

The business intelligence module 64 can handle reporting and analysis of data based on responses from individuals who have received and responded to communications content. An example of a business intelligence module 64 is the business warehouse (BW) business intelligence tool provided by SAP. The database 66 can be used for storage and retrieval of raw data derived from responses from recipients of communications content. For example, original data from the results of a survey can be stored for later retrieval and analysis.

Figure 5:
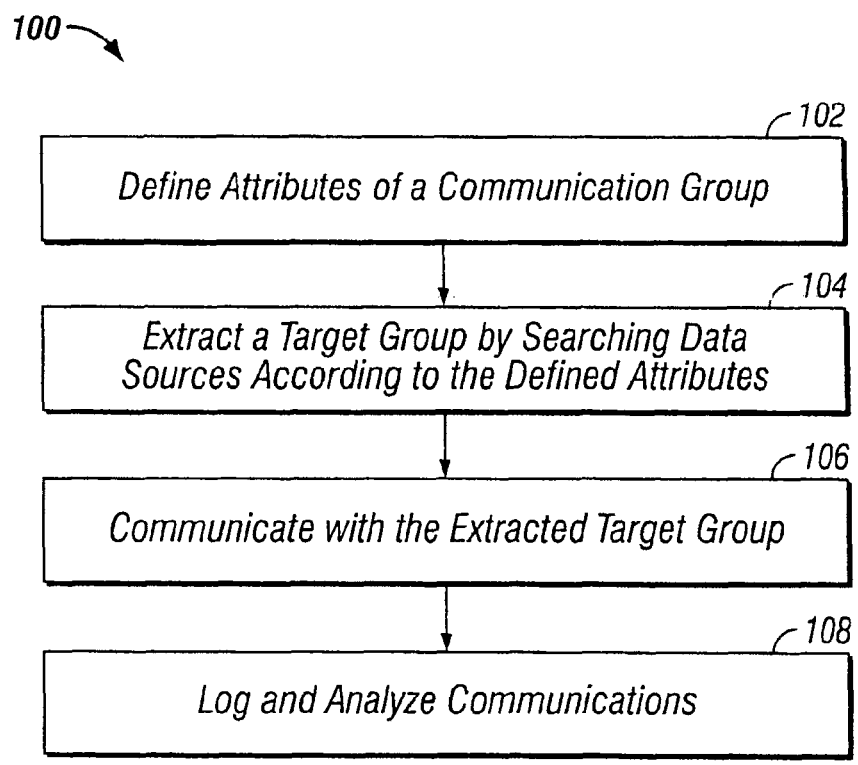
FIG. 5 is a flow chart of an implementation of an human capital information management module associated with an information exchange tool.

FIG. 5 is a flow chart 100 of an implementation of an HCIM module 25 of FIG. 1. The HCIM module 25 is capable of "mining" human capital information by identifying a target group, distributing information to the target group, receiving structured feedback from the group, and analyzing the feedback.

To illustrate, assume that an enterprise has approved a project that requires individuals with knowledge in a particular programming language. The HCIM module 25 can define (102) one or more attributes of a target group (i.e., a group having a common attribute associated with an enterprise). Continuing with the example, a team leader responsible for staffing the project can access the KGI module 30 of module 25 (see FIG. 2) through user-interface 32 and enter a request for individuals having knowledge of a particular programming language.

The HCIM module 25 can extract (104) a target group by searching on or more explicit and implicit data sources according to the defined attributes. For example, the HCIM can use the KGI module 30 to search explicit and implicit data sources 36 (see FIG. 2) to extract a list of members having knowledge of a particular language (i.e. knowledge group).

Once a knowledge group has been identified (or defined), the HCIM module 25 can communicate (106) with the extracted target group. For example, the user can exchange information with the target group by accessing the CT module 40 (see FIG. 3) of the HCIM module 25 through the user-interface 42 to create content directed to the knowledge group. The content generator 48 can be used to create email messages embedded with a survey. The survey can have questions such as the depth of the individuals experience using a particular language. The content distribution module 44c distributes the surveys to the knowledge group. The tracking/ logging module 44d logs recipients of a survey and tracks and stores responses to the survey.

The user then can access the HCIM module 25 to log and analyze (108) some of the communications. For example, the AR module 60 can provide logging, analysis and reporting tools so that the user can view response information from different perspectives. For example, the business intelligence module 64 can employ statistical techniques to generate reports based on the responses to the survey. As a result using the information exchange tool, the user may be able to quickly identify and communicate with a target group, analyze the data received from members the group and make a decision regarding the individuals.

Distribution List Management

Figure 6:
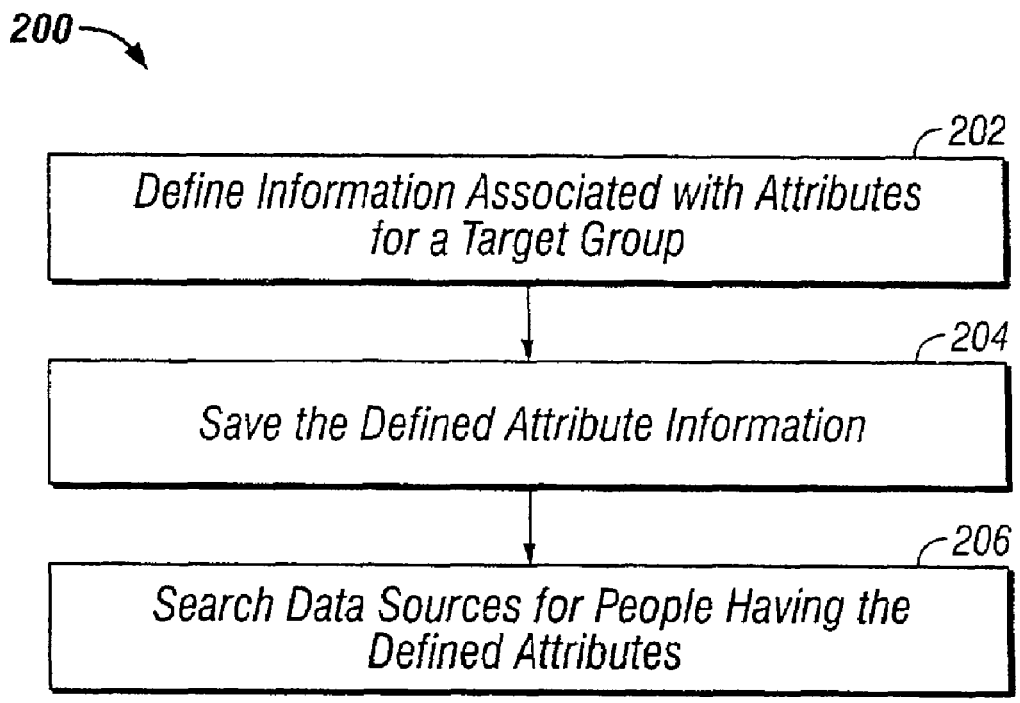
FIG. 6 is a flow chart of an implementation of a distribution list management module associated with an information exchange tool.

FIG. 6 is a flow chart 200 of an implementation of a DLM module 70 associated with the information exchange tool 20 of FIG. 1. The DLM module 70 is capable of establishing a target group by providing distribution lists based on a feature that is common to a group rather than a static identifier such as an identification number assigned to an employee of an enterprise (e.g. social-security-number). To illustrate, assume that a user is interested in creating a distribution list of members who have a common attribute such as members who work in a particular cost center in an enterprise. The user accesses the tool 20 to define (202) information associated with attributes for a target group. In this case, members who work in a cost center, from among members in an enterprise.

The user can then save (204) the defined attribute information for subsequent communications. For example, the KGI module 30 searches data sources 36 (see FIG. 2) as well as the ERP system 22 to extract a list of members who work in the cost center. The CT module 40 communicates content, such as an email, to the members of the list and the AR module 60 analyzes and reports responses received from the members.

Assume further that the user intends to send a subsequent email message to the members of the distribution list. The tool 20 then searches (206) explicit and implicit data sources for people having the defined attributes. For example, the list of members can be based on a change to members in the enterprise. In this example, the KGI module 30 conducts a search of the data sources 36 to determine whether any additional members satisfy the common attribute of working in a particular cost center. As a result, the distribution list is updated to reflect the current state of the members of the enterprise.

Once the distribution list has been updated, the user can proceed to access the tool 20 to exchange information with the members of the list over a communications channel. In this example, the members can be sent another email over a computer network.

The techniques of the DLM module 70 can be applied to one or more of the following applications. Conventional email systems have specific predefined or explicit user-defined distribution lists. Such distribution lists may involve static identifiers such as an identification number or an e-mail address. These static distribution lists may be generated at a specific point of time—either manually or by executed programs. The creation and on-going maintenance of these distribution lists may be time consuming and therefore expensive. Between the creation of the static distribution list and the usage of the distribution list, the distribution list may no longer be current.

Such conventional distribution lists may be limited by the expense involved in their creation and maintenance. They remain broad in scope, and therefore are normally only used for the most general purposes (broadcast communication to a general populace). For example: Company ABC wants to send information to employees with more than 5 years of company seniority to determine whether they may be eligible for daycare. Building the static distribution list is very time consuming. The process is inefficient for such a one-time e-mail. In another example: Company XYZ manually created a distribution list for all expatriates working in the US. A person is assigned to update the distribution list on an on-going basis. Due to human error, the distribution list may be incomplete and incorrect at the time of initial creation (individuals erroneously included or excluded). Incompleteness and incorrectness increases over time with expatriate turnover.

The systems and techniques described here may be able to solve these problems through the use of the DLM module 70. The module solves the problem through the creation of distribution lists that are defined by their membership criteria, rather than by their membership. Rather than saving a list of email addresses, the DLM module 70 saves a set of membership criteria (i.e. rather than store a list of the fifty people who reported to Department X on January 1st, the module saves the criteria "reports to Department X"). At the time the DLM distribution list is used to send a message, the DLM module 70 connects to an ERP system 22 containing the up-to-date organizational information, finds the individuals who currently satisfy the membership criteria, and sends the message to those individuals.

An aspect of the DLM module 70 is its integration with an ERP system 22. An ERP system 22 may store up-to-date organizational information and the may be updated periodically as part of an enterprise's normal business processes. The DLM module 70 uses the up-to-date data in the ERP system (s) 22 to identify those individuals who currently satisfy the membership criteria of a distribution list, at the time the distribution list is actually used to send a message.

The KGI module 30 provides the connectivity to the ERP system(s). At the time of the distribution list usage, the common features of the group will be evaluated by the KGI component. The search pattern assigned to a distribution list will be passed to the KGI component. Using the search pattern, the KGI component will "search" the applicable ERP system(s) and return the identification numbers and/or the e-mail addresses of the members adhering to search pattern.

For example, a company may create a distribution list for all expatriates working in the United States (US) by entering contract type "expatriate" and work location "US." The search pattern "contract type=expatriate" and "work location=US" will be assigned to the distribution list. Using the distribution list will result in the determination of all employees within the company with contract type "expatriate" and work location "US" at the time of usage. For determination of these employees, the DLM module 70 will pass the common features of the group to the KGI component. The KGI component than provides the identification numbers and/or the e-mail addresses of the group members.

In another example, a company desires to send information to determine availability of employer provided day care for eligible employees (i.e., employees with more than 5 years of company seniority). Entering company seniority "more than 5 years" and number of children "more than 0" will assign the search pattern "company seniority >5 years" and "number of children >0" to the distribution list. In another example: an company wants to send product information to its customer base. A distribution list with the criteria "Purchase category=HR software" and "Number of licenses >500" is created. The DLM uses information stored in the company's Customer Relationship Management (CRM) system to retrieve the information, receives a list of customer contacts, and sends the information to the contact addresses. When additional information is sent out the following month using the same DLM distribution list, new customers acquired in the interim are automatically included in the mailing.

The DLM module 70 may provide one or more of the following advantages. The DLM may be able to provide a distribution list membership that is current and complete. The DLM module 70 also may allow the creation of distribution lists that would otherwise be too specific (i.e. too costly and inefficient) to be of use employing existing techniques. Moreover, the DLM 70 may allow on-the-spot user-creation of distribution lists at the time of communication. An administrator no longer has to create distribution lists in advance, no longer limiting their use, since the generic lists may be adequate for the purpose of the individual user.)

Relationship Identifier and Communications

Figure 7:
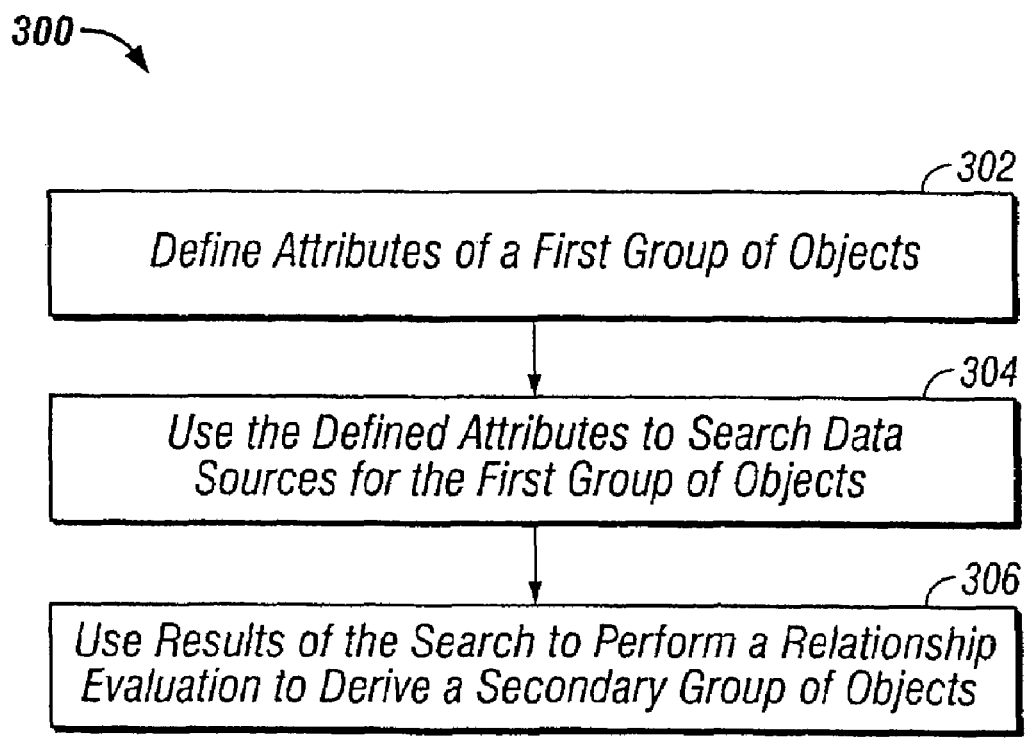
FIG. 7 is a flow chart of an implementation of a relationship identifier and communications module associated with an information exchange tool.

FIG. 7 is a flow chart 300 of an implementation of a RIC module 80 associated with the information exchange tool 20 shown FIG. 1. The RIC module 80 is capable of identifying members in an enterprise having a relationship (e.g., worker and manager) with other members in an enterprise. To illustrate, assume that a team leader is seeking individuals having a certain technical experience to work on the project. The team leader would access the tool 20 and enter a request for individuals having a common attribute such as technical experience using a programming language needed for the project. The tool 20 proceeds to identify (302) a first group of objects (members) in an enterprise by searching the ERP system 22 or other member data source. In this example, the user can access the functionality of the KGI module 30 to define individuals having certain technical experience and return a list of those individuals.

The RIC module 80 uses (304) uses at least some of the attributes to search data sources 36 including explicit and implicit data sources. However, in this example, the team leader is interested in contacting the managers of these individuals instead of the actual individuals. For example, the KGI module may have identified 300 members (knowledge group) having the required technical experience, but only 30 members (managers) who have a management relationship with the knowledge group. Communicating with the managers directly can reduce the amount of communications exchanged because there are typically fewer managers than there are individuals who are managed.

Once the first group of individuals has been identified, the team leader can access the tool 20 and the results of the search above (304) to perform a relationship evaluation (306) to derive a secondary group of objects. In this example, the second group corresponds to managers of the individuals in the first group. The KGI module 30 searches data sources 36 for managers (second group) of the individuals of the first group and returns a list of those managers.

Once the second group has been identified, the tool 20 can allow the members in the second group to send a request for information related to the members of the first group. In this example, the team leader accesses the content generator 44a of the CT module 30 to create content such as an email containing a survey. The distribution module 44c sends the email to the members of the second group over a communications channel such as a computer network. As a result of the tool, the team leader can now quickly create a survey with structured question sets such as the following: "On a scale of 1 to 5, which of these individuals could be made available in a specified timeframe?"; "Does the knowledge the individuals have actually fit the requirements of the project?"; and "Which of the individuals would be willing to relocate to the US?"

Consequently, the team leader may be able to communicate with the managers (second group), which represent a smaller number of individuals compared to the actual individuals (first group), and thus can make a decision quickly regarding individuals eligible to work on the project. Without the tool, the team leader, with perhaps email and telephone as his only communication methods, would have to individually find and categorize the answers to his questions from the first group. Moreover, without the tool, the team leader may only after extensive email exchanges and interviews with the individuals and their managers, have been able to assemble a project team.

An underlying task of the disclosed techniques may involve building a group of individuals (e.g. for the purpose of communication such as email, mailing, etc.), using the criteria of their relationships with other individuals.

The techniques of the RIC module 80 can be applied to other applications. For example, a human resources (HR) manager may be able to identify managers of all employees who work at a certain office location; a Finance Department can communicate with the Administrative Assistants of all managers who have recently had a certain expenditure charged to their cost centers; a Project Manager can communicate with all HR representatives, who are responsible for Managers, who have particular experience in an area in their organizational units. These methods also can be used to build a distribution list of individuals, for the purpose of communication (email, mailing, etc.), using the criteria of their relationships with other individuals, and find relationships between individuals in an organization.

These techniques may include a process that derives a secondary group from a primary group of individuals, using their relationships as defined in an ERP system. An ERP system can store up-to-date organizational information; the data in these systems is updated constantly as part of an enterprises daily business processes. The process uses the "relationship" information implicitly stored in such ERP systems to build the secondary grouping. This process can be carried on indefinitely for example the secondary grouping can be used to form a tertiary grouping, etc.) For instance, in ERP HR systems, the "working address" of an employee as well as the employee's organizational unit may be defined. Each organizational unit may have a manager defined as its "person responsible". Using this information, the Relationship Identifier can build a list of all Managers who are responsible for employees working at a certain office location. (For example, such a list would be used to advise managers that computers systems at the office location are expected to be unavailable for a certain time period, which may affect the productivity of their employees.)

These techniques also may allow the evaluation of relationships between individuals. Conventional "search or ad hoc query engines" may allow specific searches, but may lack the ability to determine several relationships among people (e.g., the HR manager, administrative assistant, safety inspector, line supervisor, project members, etc.). The RIC module 80 may allow a flexible evaluation of relationships of a primary group to determine a secondary group. Moreover, the process can be performed in an iterative manner. The secondary group can be used as input to derive a third group, ad infinitum (e.g. the first group is a set of factory line workers, the secondary group is the set of all inspection officers responsible for their line(s), the third group is the set of reporting managers of the inspection officers, etc.).

Examples of Specific Applications for the Disclosed Techniques

The techniques disclosed herein can be used in one or more of the following applications. In one example, the techniques can provide support for "Expertise Location." For instance, an internal management team responsible for evaluating new product ideas requires background information on an innovative "Information Mining" proposal. Using the KGI module 30 of the information exchange tool, the team can quickly identify knowledge groups within their company who may be able to answer questions about the feasibility and desirability of the new product. They design and distribute a quick survey, tailor made for each knowledge group, using the functionality of CT module 40 of the tool 20. They evaluate the feedback from the members of the group through the AR module 60 of the tool 20. Consequently, the team can approve the proposal with more confidence.

The techniques disclosed herein can facilitate "Roles distribution." For instance, an Account Manager observes a recurring problem of under/over-estimation of implementation costs by Account Representatives. Potential customers or prospects may be hesitant to establish a relationship or an account with the Account Representative unless they can provide the prospects reliable information associated with implementation time and cost related to a project. The Account Manager accesses the functionality of the CT module 30 of the information exchange tool 20 to design and send a strategic survey to all consultants in the field with implementation experience for that product. The survey includes questions directed to the consultants such as sector and size of their customers, the implementation time and cost, and the areas where problems were encountered. The AR module 60 of the tool 20 monitors and analyzes response to the survey providing the Account Manager with a reliable set of data to make improved request for proposal (RFP) replies to prospects. The AR module 60 of the tool 20 also can make this data available throughout the sales organization.

The techniques also can permit "ERP integration." For example, a corporate buyer needs to measure his company's decision for buying various new automotive care products. The buyer uses the company's current inventory management system (e.g. the MM inventory management system provided by SAP) to determine why there has been a slow movement of the goods ordered. The buyer would like to conduct a survey to determine the reason for the high inventory level and to propose a sales promotion plan. The buyer can access the CT module 40 of the information exchange tool 20 to generate and send a survey to all account representatives responsible for retail and automotive accounts with a specified annual billing. The AR module 60 manages the responses to the survey and makes this data available to others in the buyer's department. Also using the KGI module 30 of the tool 20, the buyer can form a knowledge group audience for his sales promotion plan, and "push" (i.e. distribute) this information out to the interested parties.

In another "ERP integration" example, assume that an HR manager needs to decide whether child-care services would be valuable at his company, for several locations. He can use the information exchange tool 20 to send a survey to all full-time employees with dependents under the age of 12 and ask whether they would use such services if they cost $X, $Y or $Z, how often would they use the services, and how much they currently pay for childcare. The HR Manager can use existing data from the ERP system 22 (no query required) to incorporate the location and employment status of the respondent. Using the compiled data, the HR Manager can use the functionality of the AR module 60 to quickly determine the best-fit solution for his company and his employees.

The techniques disclosed herein also can support "Data Persistency." To illustrate, assume that manager of a finance department in an enterprise needs to measure the internal satisfaction of the cost center managers regarding financial services provided. The manager submits uses the CT module 40 of the information exchange tool 20 to generate a questionnaire to all cost center managers within the company. The results of the survey can be processed by the AR module 60 to determine deficits and fine-tune the financial service offerings. A year after this initiative, a new Finance Manager has the original data of the first survey available (stored through AR module 60 of the tool 20), and can build on this information in a follow-up initiative.

In another "Data Persistency" application, the techniques disclosed herein can be used to trigger an automatic survey. For instance, assume that a company is interested in measuring the feedback of their employees regarding the training they received. After a training class provided within the company, a record of the employee's attendance is recorded in Master Data of an enterprise's ERP system 22. The data entry triggers an automatic survey from the CT module 30 of the information exchange tool 20 which is sent out to the employee. The survey contains questions related to the trainer, the educational content and the facilities provided. The AR module 60 of the tool 20 can be used to analyze the results of the survey to evaluate benchmark training offered against an average and to determine future actions. At some future time (e.g., half a year after completion of the class), an automatic follow-up survey is sent out to all participants, asking for example, "How have you been able to apply the content of the class within your daily work?" The information may then be used to fine-tune training offerings according to the current needs of the company.

The techniques disclosed herein can be used to facilitate "Survey Management." For instance, assume that an organizational unit of the company plans to attend a technical seminar, but funding is tight. The information exchange tool 20 can be used to generate a survey asking questions about the exact number of attendees, lodging and transportation requirements, etc. A high participation rate is required for accurate cost planning. Using the CT module 40 of the tool 20, managers with low participation rates are contacted and reminded to stress the importance of the survey to their employees.

In another example of "Survey Management", the techniques can be used to trigger "on-the-spot" surveys such as an exit survey. For instance, after being involved in an expatriate assignment, a survey is triggered by the work/life event "Return from Assignment" and automatically submitted to an employee. The results from these surveys are collected on an ongoing basis and stored by the AR module 60 of the information exchange tool 20. Aggregate survey results for any give time period can be viewed at any time by the HR department to determine possible deficiencies with the expatriate process.

In another application, the techniques disclosed herein can be used to for "Event Triggers for information distribution." For instance, following a life event, such as the birth of a child, an informational email is sent to the employee, informing them of company benefits for dependents. The email can provide a link to a "Benefits Enrollment" Web page of the company's Intranet with instructions for changing employee status and benefits. Similarly, following a work event, such as a change in position, standard safety procedures and responsibilities associated with the new position can be automatically distributed to the employee and the employee's current manager. A record of the information distributed is stored in the AR module 60 of the information exchange tool 20, providing an automatic "paper trail."

It should be understood that the above applications represent illustrative examples. One skilled in the art would comprehend that the techniques disclosed herein can be employed in other applications.

The systems and techniques described here can be implemented in digital electronic circuitry, or in computer hardware, firmware, software, or in combinations of them. The systems and techniques described here can be implemented as a computer program product, i.e., a computer program tangibly embodied in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the systems and techniques described here can be performed by one or more programmable processors executing a computer program to perform functions of the disclosed techniques by operating on input data and generating output. Method steps can also be performed by, and apparatus of the disclosed techniques can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the systems and techniques described here can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component, e.g., an application server, or that includes a front-end component, e.g., a client computer having a graphical user interface or an Web browser through which a user can interact with an implementation of the disclosed techniques, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Other embodiments are within the scope of the following claims.

What is claimed is:

1. A computer-implemented method for assembling a project team using relationships defined in an Enterprise Resource Planning (ERP) system, the method comprising:

receiving, by one or more processors in the ERP system, a request from a team leader who is seeking individuals having a certain technical experience to work on a project, the request defining individuals having a common attribute for the certain technical experience;

identifying, by the one or more processors, and based on the request, a first group of objects corresponding to employees, the identification performed using information in the ERP system obtained by extracting the common attribute from emails of the employees;

identifying, by the one or more processors and based on the first group of objects, using employee-manager relationships defined in the ERP system, a secondary group of objects corresponding to managers of the employees;

providing, by the one or more processors and based on the secondary group of objects, a survey in the ERP system to the managers of the employees, the survey including at least one structured question regarding which of the employees are eligible to work on the project;

receiving, by the one or more processors, responses to the survey from at least some of the managers, the responses indicating eligible employees from among the first group of objects; and storing in the ERP system in response to the request, by the one or more processors and based on the responses, a definition of the project team that includes at least some of the indicated eligible employees.

\* \* \* \* \*